US008839834B2

(12) United States Patent
Okuda

(10) Patent No.: US 8,839,834 B2
(45) Date of Patent: *Sep. 23, 2014

(54) MASKING DEVICE USING MASKING JIG

(71) Applicant: FANUC Corporation, Yamanashi (JP)

(72) Inventor: Mitsuhiro Okuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/661,382

(22) Filed: Oct. 26, 2012

(65) Prior Publication Data

US 2013/0118689 A1 May 16, 2013

(30) Foreign Application Priority Data

Nov. 16, 2011 (JP) .................................. 2011-250690

(51) Int. Cl.
- B32B 41/00 (2006.01)
- B32B 38/00 (2006.01)
- B32B 37/12 (2006.01)
- B29C 65/00 (2006.01)
- B05B 15/04 (2006.01)
- B25J 11/00 (2006.01)
- B05D 1/32 (2006.01)
- B25J 9/00 (2006.01)

(52) U.S. Cl.
CPC ................ B05D 1/32 (2013.01); B05B 15/045 (2013.01); B05B 15/04 (2013.01); B25J 11/0075 (2013.01); B25J 9/0084 (2013.01); Y10S 901/43 (2013.01); Y10S 901/50 (2013.01)
USPC ........... 156/367; 156/351; 156/368; 156/378; 156/379; 901/43; 901/50

(58) Field of Classification Search
CPC .......... G05G 15/00; B05B 1/28; B32B 37/12; B32B 41/00; B32B 38/1825; B32B 38/1813; B25J 9/0084; B05D 1/32
USPC ................. 156/351, 367, 368, 378; 19/43, 50
See application file for complete search history.

(56) References Cited

U.S. PATENT DOCUMENTS

| 2003/0154919 A1 | 8/2003 | Rice et al. |
| 2004/0011284 A1 | 1/2004 | Schucker |

(Continued)

FOREIGN PATENT DOCUMENTS

| DE | 10048749 A1 | 4/2002 |
| DE | 102009060649 A1 | 6/2011 |

(Continued)

OTHER PUBLICATIONS

Translation of JP 9-141577 A, Jun. 1997, Noriyuki, all pages.*

(Continued)

Primary Examiner — George Koch
(74) Attorney, Agent, or Firm — Lowe Hauptman & Ham, LLP

(57) ABSTRACT

A masking device capable of effectively carrying out a masking operation using a masking jig by means of a robot. A step S5, wherein the masking jig is taken out by a second robot, must be completed prior to step S6, and may be carried out until step S2 has been completed, otherwise, may be carried out concurrently with step S4. Since the taking out operation of the masking jig by the second robot may be concurrently with the detecting/taking-out operation of the workpiece or the applying operation of adhesive by the first robot, cycle time may be reduced.

9 Claims, 7 Drawing Sheets

(56) References Cited

U.S. PATENT DOCUMENTS

| | | | |
|---|---|---|---|
| 2007/0281100 A1* | 12/2007 | Herre et al. | 427/407.1 |
| 2009/0025199 A1* | 1/2009 | Hariki et al. | 29/430 |
| 2012/0199289 A1* | 8/2012 | Oda et al. | 156/351 |
| 2012/0304924 A1 | 12/2012 | Fernholz et al. | |

FOREIGN PATENT DOCUMENTS

| | | | |
|---|---|---|---|
| JP | H6011859 U | | 2/1994 |
| JP | 6-99118 A | | 4/1994 |
| JP | H6024767 U | | 5/1994 |
| JP | 9-141577 A | * | 6/1997 |
| JP | 9-141578 A | * | 6/1997 |
| JP | 2000-70800 A | | 3/2000 |
| JP | 2004-202348 A | | 7/2004 |
| JP | 2005-231789 A | | 9/2005 |
| JP | 2011245602 A | | 12/2011 |

OTHER PUBLICATIONS

Translation of JP 9-141578 A, Jun. 1997, Noriyuki, all pages.*
Office Action dated Nov. 21, 2013, corresponds to German patent application No. 102012022054.5.

* cited by examiner

MASKING DEVICE USING MASKING JIG

RELATED APPLICATIONS

The present application claims priority from Japanese Application No. 2011-250690, filed Nov. 16, 2011, the disclosure of which is hereby incorporated by reference herein in its entirety.

BACKGROUND OF THE INVENTION

1. Field of the Invention

The present invention relates to a masking device which carries out a masking operation using a masking jig, prior to a painting operation.

2. Description of the Related Art

When previously covering a non-painted part of an object (i.e., masking) prior to painting the object, a masking tape or a masking jig usually covers the non-painted part. For example, Japanese Unexamined Patent Publication (Kokai) No. 2000-70800 describes that "in painting operation, when an object has a portion not to be painted, it is effective to adhere a masking material such as masking tape to the portion, paint the entire object, and remove the masking tape after the painting."

A method using a masking sheet is also well known. For example, Japanese Unexamined Patent Publication (Kokai) No. 2004-202348 describes that "when airframe 1 is cleaned or painted, in order to protect an instrument such as a mounted electronic component from foreign matter, such as cleaning liquid or paint, airframe hole 5 communicated with the instrument is covered by stretchable and adhesive masking sheet 10 which can be repeatedly used."

Further, a technique of positioning a masking material by means of a magnetic body is well known. For example, Japanese Unexamined Patent Publication (Kokai) No. 6-99118 describes that "a mask may be precisely and firmly positioned and adhered to a given surface of an object to be painted by means of a magnetic body, and the mask and the object may be positioned without offsetting by merely using the magnetic body."

The present invention is intended to provide a masking device capable of carrying out a masking operation with a masking jig by using a robot. When the masking jig is attached to a workpiece by adhesive, etc., by using the robot, it is necessary to sequentially carry out the following steps: taking out a supplied workpiece; positioning the workpiece at a predetermined position; applying adhesive to the workpiece; taking out a masking jig to be attached to the workpiece; and withdrawing the workpiece to which the masking jig is attached. Therefore, a cycle time for the masking operation is increased.

SUMMARY OF THE INVENTION

An object of the present invention is to provide a masking device capable of effectively carrying out the masking operation using the masking jig by means of a robot.

According to the present invention, a masking device comprising: a first robot having an object gripping part configured to grip an object; a second robot having a masking jig gripping part configured to grip a masking jig; and an applying unit configured to apply adhesive to the object gripped by the object gripping part of the first robot, wherein the masking jig gripped by the masking jig gripping part of the second robot is attached to a masking site of the object gripped by the object gripping part of the first robot, the masking site having adhesive applied by the applying unit, by operating at least one of the first and second robots, is provided.

In a preferred embodiment, the first robot has a first detecting part which detects a gripping misalignment of the masking jig gripped by the masking jig gripping part of the second robot, and the masking jig is attached to the masking site of the object, while correcting a relative position between the object and the masking jig or correcting a relative position and relative orientation between the object and the masking jig, based on the gripping misalignment of the masking jig detected by the first detecting part.

In a preferred embodiment, the second robot has a second detecting part which detects a gripping misalignment of the object gripped by the object gripping part of the first robot, and the adhesive is applied to the masking site of the object, while correcting a relative position between the object and the applying unit or correcting a relative position and relative orientation between the object and the applying unit, based on the gripping misalignment of the object detected by the second detecting part.

In a preferred embodiment, the applying unit is mounted to the second robot, and the adhesive is applied to the masking site of the object, while relatively moving the applying unit and the object to each other, by operating at least one of the first robot which grips the object by the object gripping part and the second robot to which the applying unit is mounted.

In a preferred embodiment, the applying unit is positioned at a predetermined position within an operation area of the first robot, and the object is gripped and taken out by the object gripping part of the first robot and the taken out object is moved relative to the applying unit so as to apply the adhesive to the masking site of the object.

In a preferred embodiment, the masking device further comprises a temporary placement table positioned within a common operation area which is shared by the first and second robots, wherein the second robot comprises a second detecting part which detects a gripping misalignment of the object gripped by the object gripping part of the first robot, and wherein the first robot places the object on the temporary placement table after correcting a relative position between the object and the temporary placement table or correcting a relative position and relative orientation between the object and the temporary placement table, based on the gripping misalignment of the object detected by the second detecting part, the second robot moves the applying unit relative to the object on the temporary placement table so as to apply the adhesive to the masking site of the object, and then the second robot takes out the masking jig and attaches the taken out masking jig to the masking site of the object, where the adhesive is applied, on the temporary placement table.

In this case, the second detecting part may detect a positional misalignment of the object placed on the temporary placement table, and the second robot may apply the adhesive to the masking site of the object after correcting a relative position between the object on the temporary placement table and the applying unit or correcting a relative position and relative orientation between the object on the temporary placement table and the applying unit, based on the positional misalignment of the object detected by the second detecting part.

In a preferred embodiment, the adhesive is soluble in water and viscosity is increased due to reduction of contained water thereof, and the masking jig is made from a water-absorbing material.

In a preferred embodiment, the masking device further comprises a third detecting part which detects a position and orientation of a supplied object, wherein the first robot takes out the supplied object after correcting a position of the first robot or correcting a position and orientation of the first robot, based on the position and orientation of the object detected by the third detecting part.

In a preferred embodiment, the masking device further comprises a fourth detecting part which detects a position and orientation of a supplied masking jig, wherein the second robot takes out the supplied masking jig after correcting a position of the second robot or correcting a position and orientation of the second robot, based on the position and orientation of the masking jig detected by the fourth detecting part.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 10:
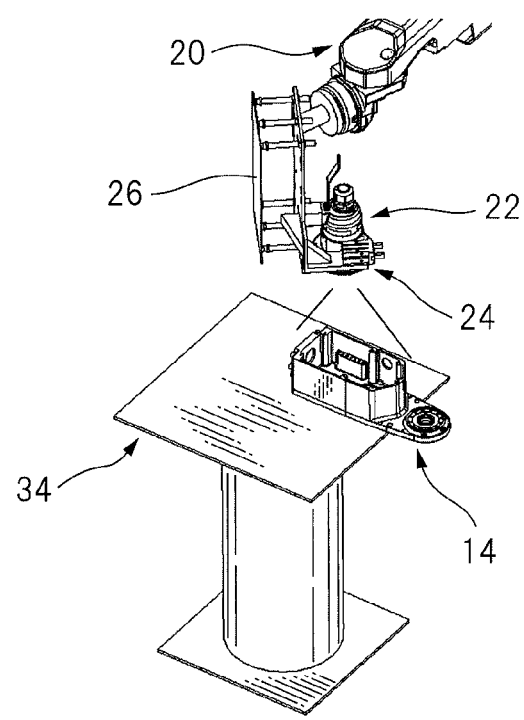
FIG. 10 shows an application of the present invention.
Figure 11:
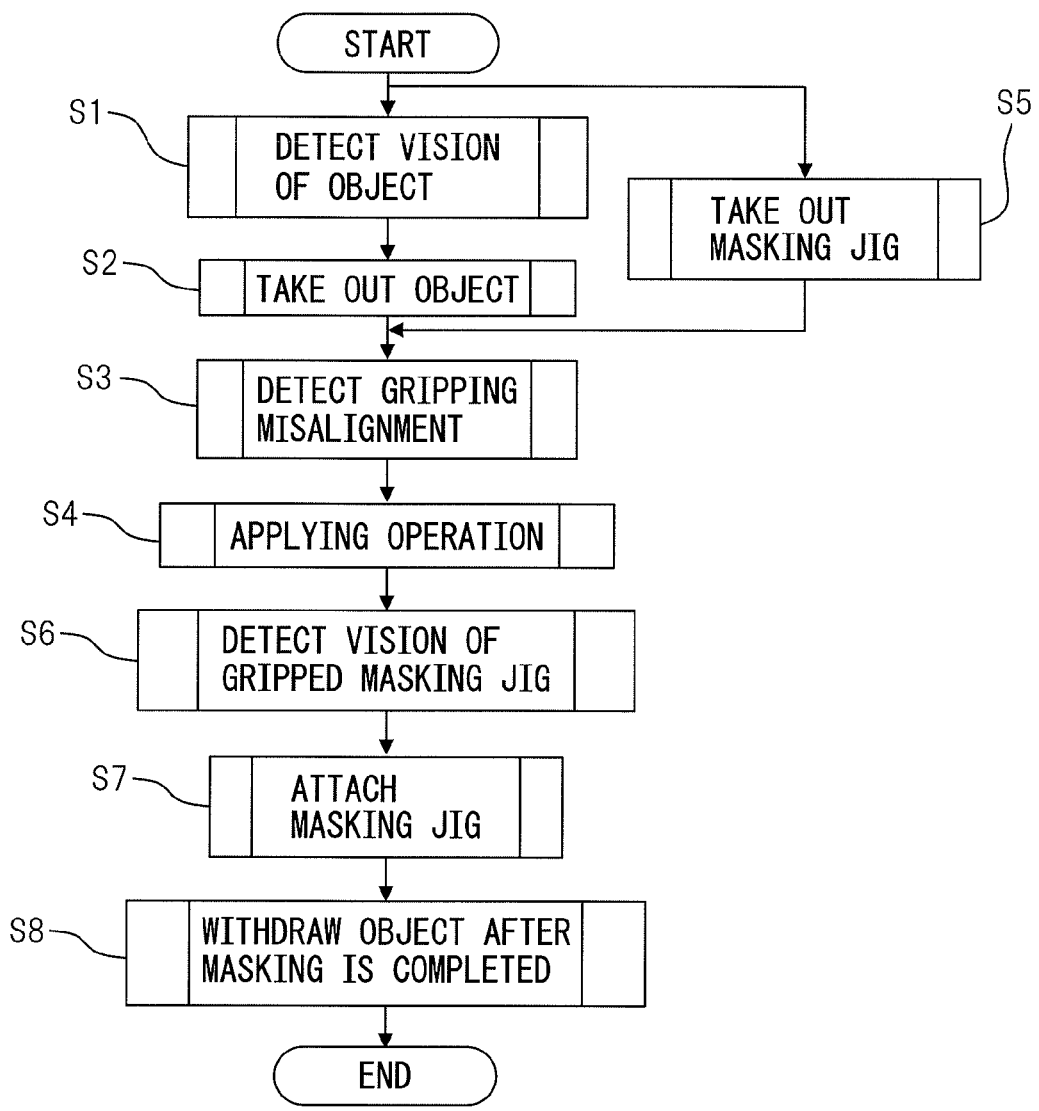
FIG. 11 is a flowchart indicating a procedure of masking operation using a masking device according to an embodiment of the invention.
Figure 12:
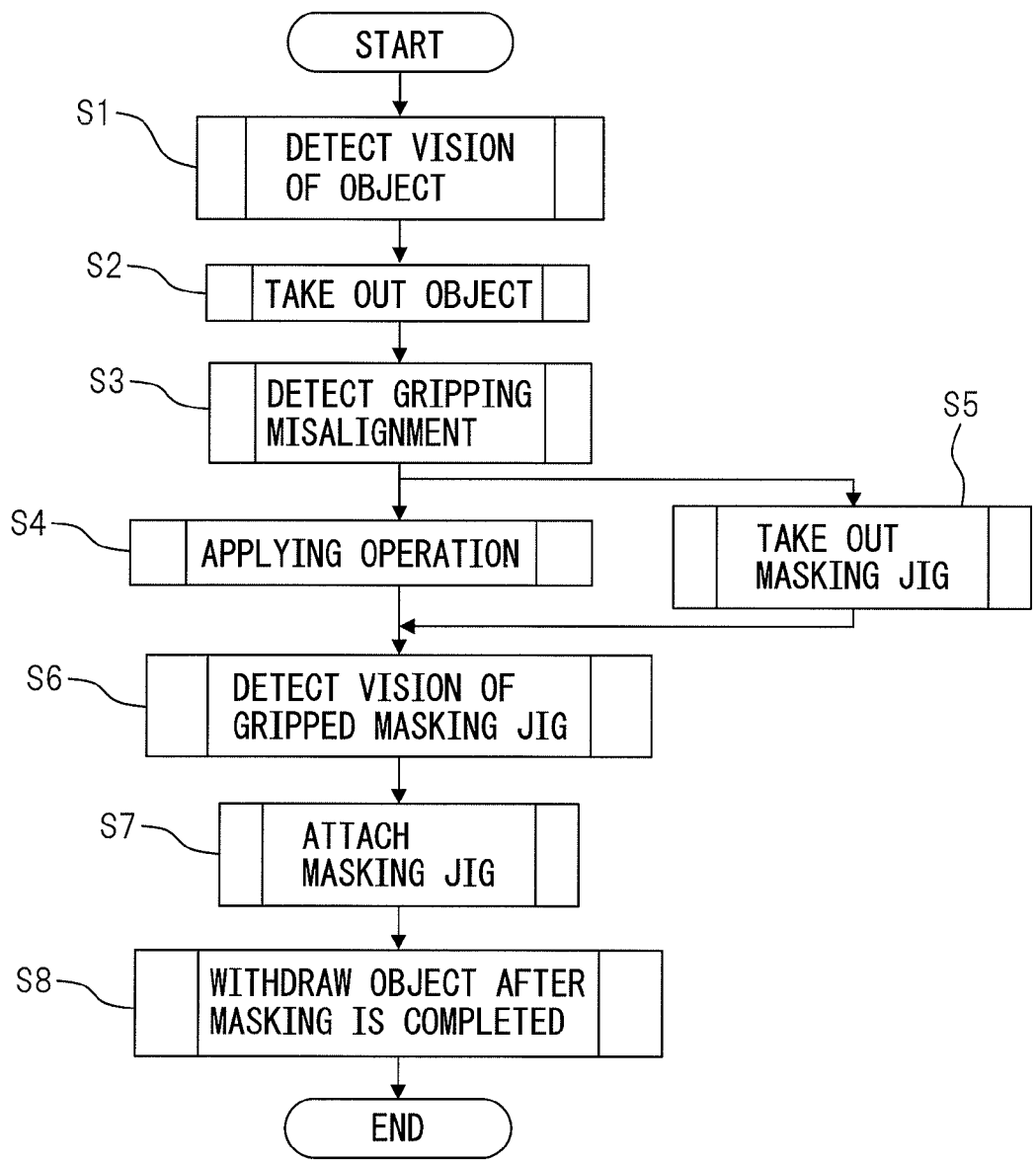
FIG. 12 shows a flowchart indicating another procedure different from FIG. 11.

Hereinafter, a preferred embodiment of the present invention is explained with reference to FIGS. 1 to 10 and flowcharts (FIGS. 11 and 12). The invention is intended to carry out a masking operation using a masking jig by means of a plurality of (two in the embodiment) robots.

Figure 1:
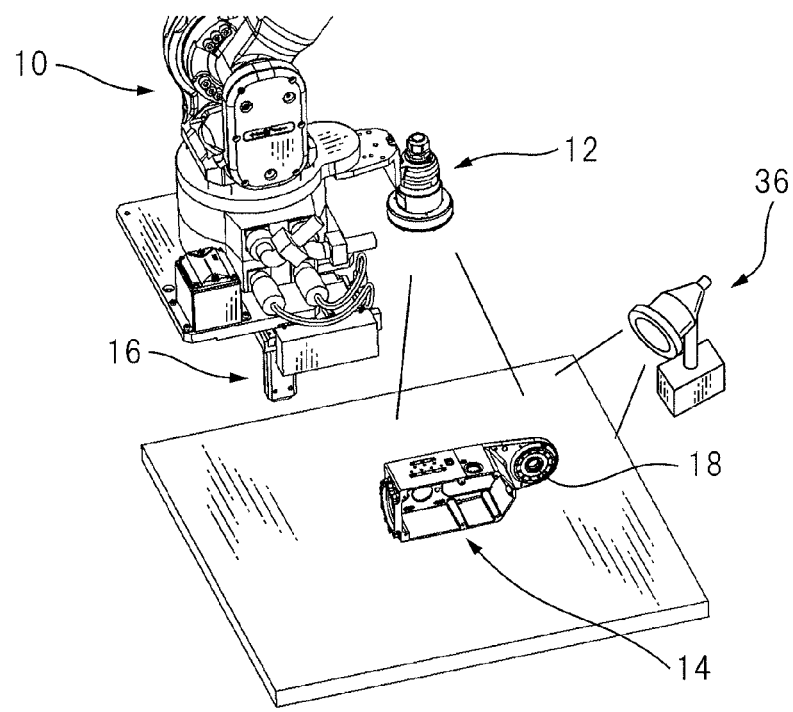
FIG. 1 shows a state wherein a workpiece is detected by a first detecting part attached to a first robot.

FIGS. 1 to 8 show a procedure of the masking operation using the masking jig. First, as shown in FIG. 1, a first detecting part (a vision sensor in the embodiment) 12 is attached to a movable part of a first robot 10, and a workpiece 14 to be masked is detected by first detecting part 12 (step S1 of FIG. 11). Concretely, in order to grip workpiece 14 by means of an object gripping part (a hand 16 in the embodiment) arranged on first robot 10, an image of workpiece 14 is captured by the first detecting part, and a position and/or orientation of workpiece is detected by the image processing, etc.

Figure 2:
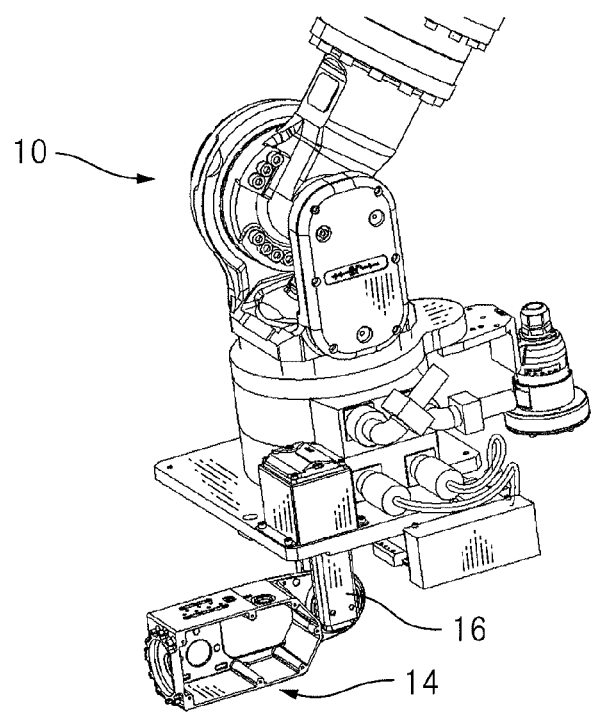
FIG. 2 shows a state wherein the first robot grips the workpiece.

Next, as shown in FIG. 2, workpiece 14 is taken out by using first robot 10 (step S2 of FIG. 11). For example, hand 16 of first robot 10 grips a predetermined site 18 (see FIG. 1) of workpiece 14, and raises the workpiece to a predetermined height which is suitable for the following operation.

Figure 3:
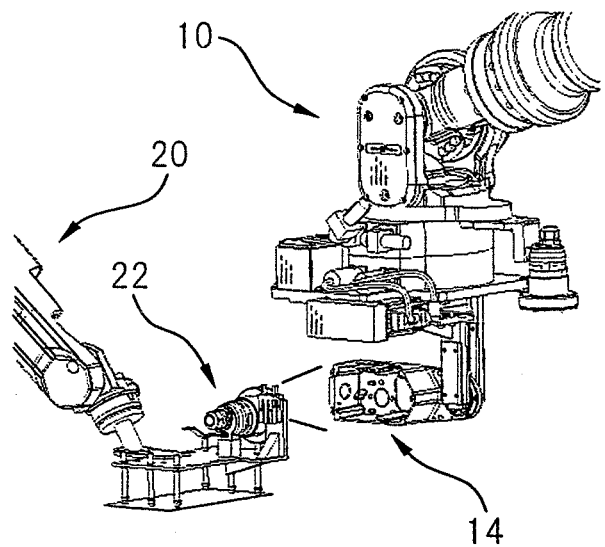
FIG. 3 shows a state wherein the workpiece gripped by the first robot is detected by a second detecting part attached to a second robot.

Next, as shown in FIG. 3, it is detected as to whether workpiece 14 gripped by first robot 10 is in a predetermined position and orientation (step S3 of FIG. 11). Herein, a state, wherein gripped workpiece 14 is not in the predetermined position or orientation, is referred to as a "gripping misalignment." For example, the gripping misalignment of workpiece 14 may be detected by capturing an image of workpiece 14 by using a second detecting part (a vision sensor in the embodiment) 22 attached to a second robot 20 which is different from first robot 10, and transmitting the obtained data to first robot 10.

Figure 4:
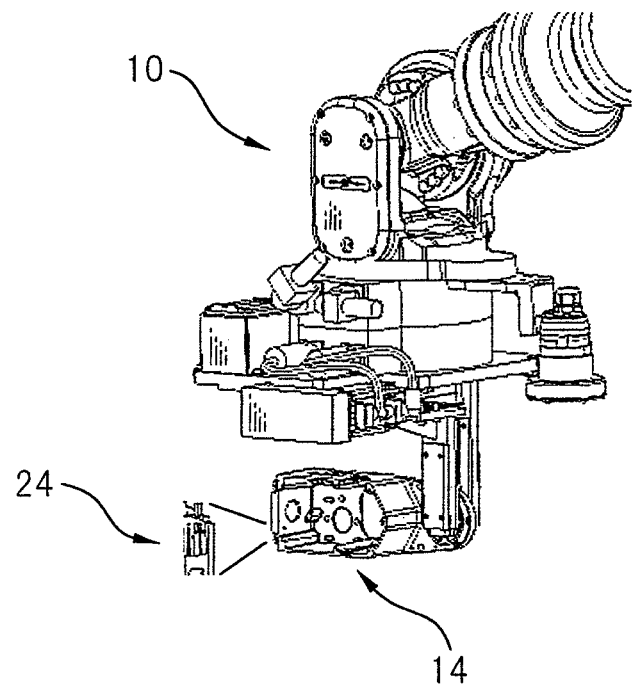
FIG. 4 shows a state wherein adhesive is applied to the workpiece.

Next, as shown in FIG. 4, by using an applying unit 24 of adhesive, the adhesive is applied to a predetermined masking site (where a masking jig as below is to be attached) of workpiece 14 gripped by first robot 10 (step S4 of FIG. 11). This applying operation may be carried out by moving robots 10 and 20 relative to each other while arranging applying unit 24 on second robot 20, or by moving first robot 10 while arranging applying unit 24 on a fixed place. When the gripping alignment is detected in step S3, at least one of robots 10 and 20 may be operated, in the applying operation of step S4, so that the gripping misalignment is corrected (concretely, the relative position between workpiece 14 and applying unit 24 is corrected, or the relative position and relative orientation between workpiece 14 and applying unit 24 are corrected).

Figure 5:
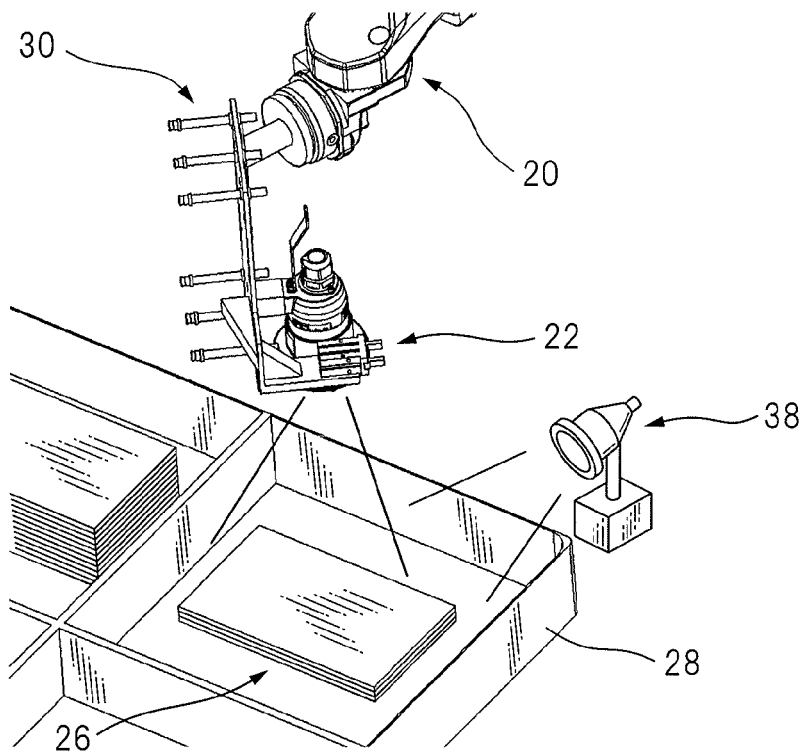
FIG. 5 shows a state wherein a masking jig is detected by the second detecting part attached to the second robot.
Figure 6:
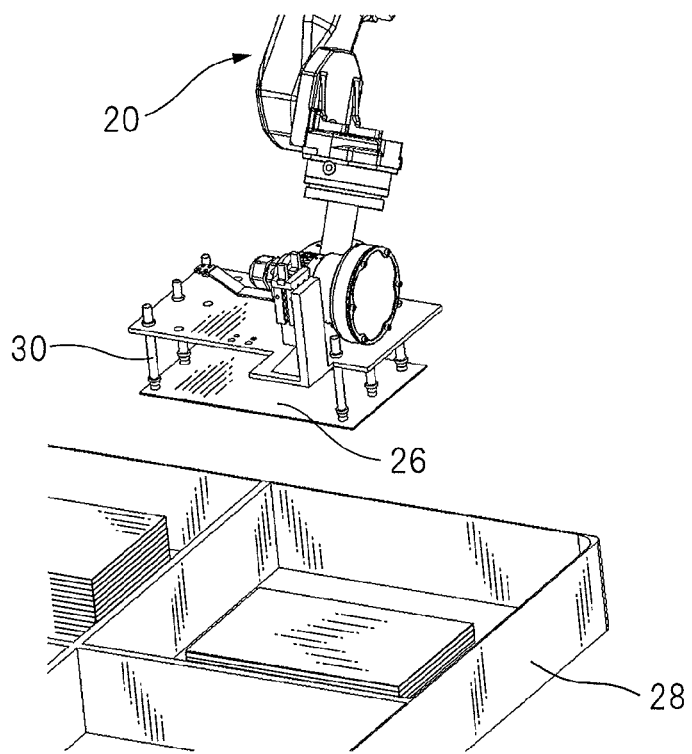
FIG. 6 shows a state wherein the second robot grips the masking jig.

FIGS. 5 and 6 explain a taking out operation of masking jig 26 by means of second robot 20. First, as shown in FIG. 5, masking jig 26 (in the embodiment, plate members contained in a tray 28 in the stacked state) positioned at a predetermined place is detected by second detecting part 22, and the position and orientation of masking jig 26 are measured. Then, as shown in FIG. 6, masking jig 26 is taken out by a masking jig gripping part such as a hand or absorbing part 30 attached to the front end of second robot 20.

The step (S5), wherein masking jig 26 is taken out by second robot 20, is required to be completed prior to step S6 as described below. Therefore, step S5 may be carried out until step S2 has been completed as shown in FIG. 11, otherwise, step S5 may be carried out concurrently with step S4 as shown in FIG. 12 which indicates another example of the masking operation. In this regard, when the applying operation in step S4 is carried out while applying unit 24 is attached to second robot 20, step S5 is carried out until step S2 has been completed (FIG. 11). On the other hand, when applying unit 24 is arranged at a predetermined place within the operation area of first robot 10, step S5 may be carried out until step S2 has been completed, otherwise, step S5 may be carried out concurrently with step S4 as shown in FIG. 12. As such, in the invention, the taking out operation of the masking jig by second robot 20 can be carried out concurrently with the detection/taking out or the application of the adhesive by first robot 10, whereby cycle time of the procedure may be reduced.

Figure 7:
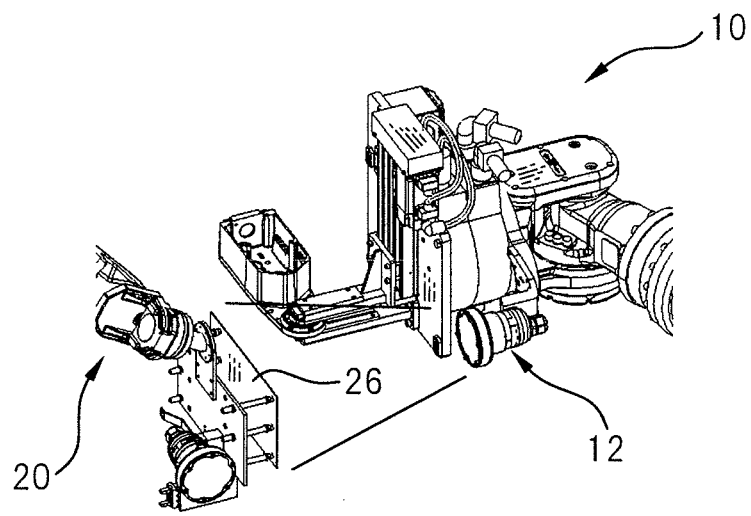
FIG. 7 shows a state wherein the masking jig gripped by the second robot is detected by the first detecting part attached to the first robot.

In the next step S6, as shown in FIG. 7, it is detected as to whether masking jig 26 gripped by second robot 20 is in predetermined position and orientation. Herein, a case wherein masking jig 26 in the gripped state is not in the predetermined position and orientation, is also referred to as the "gripping misalignment." For example, the gripping misalignment of masking jig 26 may be detected by imaging masking jig 26 by means of first vision sensor 12 attached to first robot 10, as shown in FIG. 7.

Figure 8:
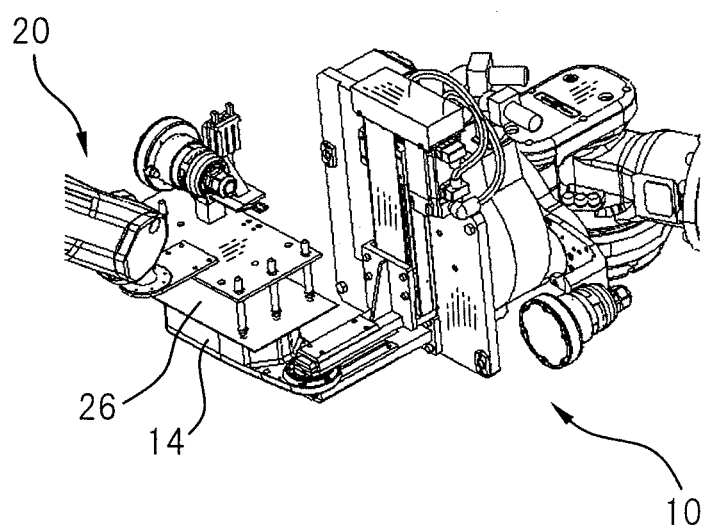
FIG. 8 shows a state wherein the masking jig is attached to the workpiece by operating the first and second robots.

Next, as shown in FIG. 8, by moving first robot 10 and second robot 20 relative to each other, masking jig 26 gripped by second robot 20 is attached to a predetermined site (where the adhesive is applied) of workpiece 14 gripped by first robot 10 (step S7). In this regard, when the gripping misalignment of masking jig 26 is detected in step S6, at least one of robots 10 and 20 may be operated in the attachment operation in step S7, so as to correct the gripping misalignment (concretely, correct the relative position between masking jig 26 and workpiece 14, or correct the relative position and orientation between masking jig 26 and workpiece 14). In the invention, in the attaching operation of masking jig 26, a configuration may be realized, wherein one robot (first robot 10) grips workpiece 14, the other robot (second robot 20) grips masking jig 26, the detecting part of the one robot detects the gripping misalignment of the other robot, and masking jig 26 is attached to workpiece 14 after the positional correction etc., is carried out. Therefore, time required for the attaching operation may be reduced.

Figure 9:
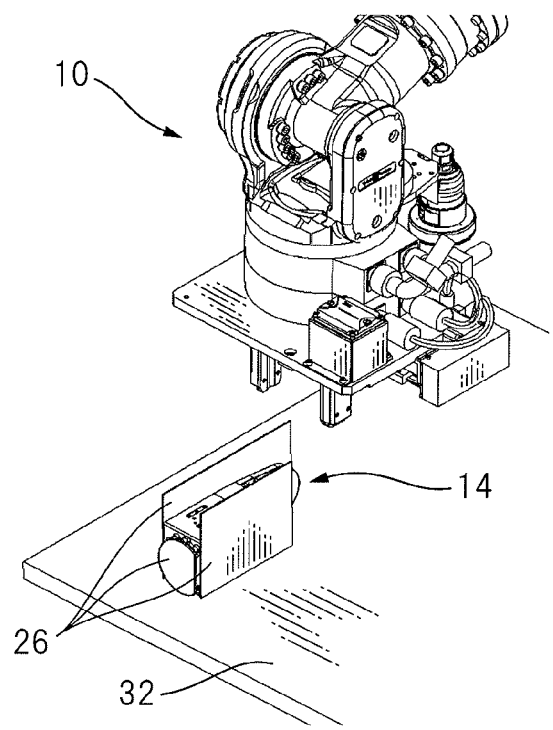
FIG. 9 shows a state wherein the workpiece having the masking jig attached thereto is withdrawn to a predetermined position.

Finally, as shown in FIG. 9, a withdrawal operation is carried out, wherein workpiece 14, having masking jig 26 attached thereto, is moved a predetermined place 32 by the motion of first robot 10 (step S8). Although FIG. 9 shows an example wherein three masking jigs 26 are attached to workpiece 14, the number and the shape of the masking jig may be varied depending on the shape of the workpiece, etc.

FIG. 10 shows an application of the present invention. In a common operation area of the first robot (not shown) and second robot 20, a temporary placement table 34 is positioned. First, based on the gripping misalignment of workpiece 14 which is taken out by the first robot and gripped by the object gripping part such as robot hand 16 (see FIG. 2), the first robot places workpiece 14 on temporary placement table 34 after correcting the relative position between workpiece 14 and temporary placement table 34 or correcting the relative position and relative orientation between workpiece 14 and temporary placement table 34. Then, second robot 20 having applying unit 24 mounted thereon moves applying unit 24 relative to workpiece 14 on temporary placement table 34 so as to apply the adhesive to the masking site (where the adhesive is to be applied) of workpiece 14. Next, second robot 20 takes out masking jig 26 and attaches the taken out masking jig to the masking site of workpiece 14, where the adhesive is applied, on temporary placement table 34.

By using temporary placement table 34, even when the masking jig cannot be attached to the workpiece since first robot 10 grips the workpiece (concretely, even when masking jig 26 cannot be attached to the masking site of workpiece 14 due to interference between hand 16 of first robot 10 and masking jig 26), masking jig 26 may be properly attached to workpiece 14 by once placing workpiece 14 on temporary placement table 34.

In the embodiment of FIG. 10, the positional misalignment of workpiece 14 positioned on temporary placement table 34 may be detected by second detecting part 22 mounted on second robot 20. In this case, based on the positional misalignment detected by second detecting part 22, second robot 20 may apply the adhesive to the masking site (where the adhesive is to be applied) of workpiece 14 after correcting the relative position between workpiece 14 on temporary placement table 34 and applying unit 24 or correcting the relative position and relative orientation between workpiece 14 on temporary placement table 34 and applying unit 24.

In the above embodiment, first detecting part 12 attached to first robot 10 has both functions for detecting the position and orientation of supplied workpiece 14 (step S1) and detecting the gripping misalignment of masking jig 26 gripped by second robot 20 (step S6). However, these detecting functions may be carried out by different detecting parts. For example, a separate third detecting part 36 for detecting the position and orientation (or the positional misalignment) of the supplied workpiece may be positioned at a fixed place, and first robot 10 may take out the detected workpiece after correcting the position or the position/orientation of the first robot, based on the positional misalignment detected by third detecting part 36 (see FIG. 1).

In the above embodiment, second detecting part 22 attached to second robot 20 has both functions for detecting the position and orientation of supplied masking jig 26 (step S5) and detecting the gripping misalignment of workpiece 14 gripped by first robot 10 (step S3). However, these detecting functions may be carried out by different detecting parts. For example, a separate fourth detecting part 38 (see FIG. 5) for detecting the position and orientation (or the positional misalignment) of the supplied masking jig may be positioned at a fixed place, and second robot 20 may take out the detected masking jig after correcting the position or the position/orientation of the second robot, based on the positional misalignment detected by fourth detecting part 38.

In addition, it is preferable that the adhesive applied to the workpiece is soluble in water and has property of increasing viscosity due to reduction of contained water thereof, and the masking jig is made from a water-absorbing material. By virtue of this, a period of time from when the masking jig contacts the site of the workpiece where the adhesive is applied to when the masking jig is bonded to the workpiece by the adhesive is shorter than the case wherein another type of adhesive is used, whereby holding time, in which the first and second robots respectively grip the workpiece and the masking jig so that the workpiece is not moved relative to the masking jig, may be reduced.

According to the present invention, the processes required for the masking operation may be shared by the first and second robots and the processes may be simultaneously carried out. Therefore, the total operation time or the cycle time may be reduced.

By providing the first detecting part for detecting the gripping misalignment of the masking jig gripped by the second robot to the first robot, the gripping misalignment of the masking jig gripped by the second robot may be detected, and the masking jig may be attached to the correct position.

By providing the second detecting part for detecting the gripping misalignment of the workpiece gripped by the first robot to the second robot, the gripping misalignment of the workpiece gripped by the first robot may be detected, and the adhesive may be applied to the correct position.

By arranging the temporary placement table within the common operation area which is shared by the first and second robots, the masking jig may be effectively attached to the workpiece even when the masking jig cannot be attached to the masking position since the first robot grips the workpiece.

When the adhesive is soluble in water and has property of increasing viscosity due to reduction of contained water thereof and the masking jig is made from a water-absorbing material, a period of time required for attaching or gripping the masking jig may be reduced.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A masking device, comprising:
   a first robot having an object gripping part configured to grip an object, and a first detecting part;
   a second robot having a masking jig gripping part configured to grip a masking jig; and an applying unit configured to apply adhesive to a masking site of the object gripped by the object gripping part of the first robot;

wherein the first detecting part is configured to detect a gripping misalignment of the masking jig gripped by the masking jig gripping part of the second robot, at least one of the first robot or the second robot is configured to correct a relative position and a relative orientation between the object and the masking jig, based on the gripping misalignment of the masking jig detected by the first detecting part, and at least one of the first robot or the second robot is configured to attach the masking jig gripped by the masking jig gripping part of the second robot to the masking site of the object gripped by the object gripping part of the first robot, based on the corrected relative position and the corrected relative orientation between the object and the masking jig, the masking site having adhesive applied by the applying unit.

2. The masking device as set forth in claim 1, wherein the applying unit is mounted to the second robot, and the adhesive is applied to the masking site of the object, while relatively moving the applying unit and the object to each other, by operating at least one of the first robot which grips the object by the object gripping part and the second robot to which the applying unit is mounted.

3. The masking device as set forth in claim 1, wherein the applying unit is positioned at a predetermined position within an operation area of the first robot, and the object is gripped and taken out by the object gripping part of the first robot and the taken out object is moved relative to the applying unit so as to apply the adhesive to the masking site of the object.

4. The masking device as set forth in claim 1, further comprising a temporary placement table positioned within a common operation area which is shared by the first and second robots, wherein the second robot comprises a second detecting part which detects a gripping misalignment of the object gripped by the object gripping part of the first robot, and the first robot places the object on the temporary placement table after correcting a relative position between the object and the temporary placement table or correcting a relative position and relative orientation between the object and the temporary placement table, based on the gripping misalignment of the object detected by the second detecting part, the second robot moves the applying unit relative to the object on the temporary placement table so as to apply the adhesive to the masking site of the object, and then the second robot takes out the masking jig and attaches the taken out masking jig to the masking site of the object, where the adhesive is applied, on the temporary placement table.

5. The masking device as set forth in claim 4, wherein the second detecting part detects a positional misalignment of the object placed on the temporary placement table, and wherein the second robot applies the adhesive to the masking site of the object after correcting a relative position between the object on the temporary placement table and the applying unit or correcting a relative position and relative orientation between the object on the temporary placement table and the applying unit, based on the positional misalignment of the object detected by the second detecting part.

6. The masking device as set forth in claim 1, wherein the adhesive is soluble in water and viscosity is increased due to reduction of contained water thereof, and the masking jig is made from a water-absorbing material.

7. The masking device as set forth in claim 1, further comprising a third detecting part which detects a position and orientation of a supplied object, wherein the first robot takes out the supplied object after (i) correcting a position of the first robot or (ii) correcting a position and orientation of the first robot, based on the position and orientation of the object detected by the third detecting part.

8. The masking device as set forth in claim 1, further comprising a fourth detecting part which detects a position and orientation of a supplied masking jig, wherein the second robot takes out the supplied masking jig after (i) correcting a position of the second robot or (ii) correcting a position and orientation of the second robot, based on the position and orientation of the masking jig detected by the fourth detecting part.

9. A masking device, comprising:

a first robot having an object gripping part configured to grip an object;

a second robot having a masking jig gripping part configured to grip a masking jig, and a second detecting part; and an applying unit configured to apply adhesive to a masking site of the object gripped by the object gripping part of the first robot;

wherein the second detecting part is configured to detect which detects a gripping misalignment of the object gripped by the object gripping part of the first robot, the adhesive is applied to the masking site of the object, while correcting a relative position and a relative orientation between the object and the applying unit, based on the gripping misalignment of the object detected by the second detecting part, and at least one of the first robot or the second robot is configured to attach the masking jig gripped by the masking jig gripping part of the second robot to the masking site of the object gripped by the object gripping part of the first robot, the masking site having adhesive applied by the applying unit.

* * * * *